(12) United States Patent
Ami et al.

(10) Patent No.: US 7,336,924 B2
(45) Date of Patent: Feb. 26, 2008

(54) BROADCAST TYPE SERVICE SYSTEM USING BLUETOOTH TYPE RADIO NETWORK

(75) Inventors: Junko Ami, Tokyo (JP); Yoshiaki Takabatake, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 717 days.

(21) Appl. No.: 09/942,759

(22) Filed: Aug. 31, 2001

(65) Prior Publication Data

US 2002/0028658 A1 Mar. 7, 2002

(30) Foreign Application Priority Data

Sep. 1, 2000 (JP) ............................ P2000-265508
Oct. 31, 2000 (JP) ............................ P2000-333615

(51) Int. Cl.
*H04B 7/00* (2006.01)
(52) U.S. Cl. ............... 455/41.2; 455/414.1; 455/426.1; 455/426.2; 455/552.1; 455/553.1; 455/556.2; 455/554.1; 455/544.2; 455/569.1; 455/569.2
(58) Field of Classification Search ............... 455/519, 455/507, 444, 518, 11.1, 13.1, 41.2, 414.1, 455/426.1, 426.2, 552.1, 553.1, 554.1, 554.2, 455/556.2, 569.1, 569.2
See application file for complete search history.

(56) References Cited

U.S. PATENT DOCUMENTS 6,275,500 B1 * 8/2001 Callaway et al. ........... 370/449
6,590,928 B1 * 7/2003 Haartsen ..................... 375/134

FOREIGN PATENT DOCUMENTS

EP          0 998 079        5/2000
WO          WO 99/37106      7/1999

* cited by examiner

*Primary Examiner*—Duc M. Nguyen
*Assistant Examiner*—Aung T Win
(74) *Attorney, Agent, or Firm*—Oblon, Spivak, McClelland, Maier & Neustadt, P.C.

(57) ABSTRACT

In a broadcast type service system using communications according to Bluetooth specification, a reception information providing device is provided in order to receive a reception establishing information of each transmission device transmitted from each transmission device which is necessary for a reception device to receive application data transmitted from each transmission device, and to transmit the reception establishing information of a specified transmission device to a prescribed reception device, such that the prescribed reception device can receive application data transmitted from the specified transmission device according to the reception establishing information of the specified transmission device received from the reception information providing device.

14 Claims, 8 Drawing Sheets

| 0 | | 31 |
|---|---|---|
| DATA NO. | | BD-ADDR |
| BD-ADDR(CONTINUED) ||| 
| HOP SEQUENCE & PHASE ||| 
| ⋮ ||| 
| SERVICE RECORDS ||| 
| ⋮ ||| 
| CODEC PARAMETERS ||| 
| ⋮ |||

BROADCAST TYPE SERVICE SYSTEM USING BLUETOOTH TYPE RADIO NETWORK

BACKGROUND OF THE INVENTION

1. Field of the Invention

The present invention relates to a broadcast service system in a radio network using the Bluetooth technology.

2. Description of the Related Art

In recent years, the Bluetooth technology has been developed as a standard wireless technology for exchanging data such as video and audio data. The Bluetooth will be mounted on digital devices such as portable telephones, note PCs, digital home electronics, etc., and realize short distance radio communications among them.

The Bluetooth utilizes the carrier frequency of 2.4 GHz band, and the frequency hopping type spectrum spreading scheme. Namely, in the Bluetooth, there are 79 channels in 1 MHz band and the interferences with the other radio communications are prevented by switching these channels at most 1600 times per second.

Consequently, in the case of connecting the Bluetooth compatible devices (which will be referred to as Bluetooth units hereafter), there is a need to match the frequency hopping patterns between them. To this end, a Bluetooth unit that determines the frequency hopping pattern (which will be referred to as a master hereafter) and a Bluetooth unit this carries out communications according to the hopping pattern determined by the master (which will be referred to as a slave hereafter) will be set in a state capable of carrying out communications through processes called inquiry and page.

Now, the Bluetooth units can be connected by a point-to-point scheme or by a point-to-multipoint scheme. An active member address in 3 bits will be allocated to each slave connected to the master at a time of communications with the master. Consequently, in the point-to-multipoint connection, it is possible to connect seven slaves to one master.

However, because the number of slaves that can be connected to the master in the point-to-multipoint connection is limited to seven, there has been a problem that it is difficult for the master to provide the broadcast type service.

Thus, conventionally, in the case of constructing the radio network using the Bluetooth technology, there has been a problem that the broadcast type service cannot be provided due to the limitation that only seven slaves can be connected to the master.

BRIEF SUMMARY OF THE INVENTION

It is therefore an object of the present invention to provide a broadcast type service system capable of providing the broadcast type service to sufficiently many devices regardless of the limitation on the number of slaves that can be connected to the master in the point-to-multipoint connection.

According to one aspect of the present invention there is provided a broadcast type service system using communications according to Bluetooth specification, the system comprising: at least one transmission device; a reception information providing device; and a plurality of reception devices; each transmission device having: a transmission device communication unit configured to carry out communications with the reception information providing device and the reception devices; and a transmission device control unit configured to control the transmission device communication unit to transmit application data to at least one reception device and to transmit a reception establishing information of each transmission device which is necessary for a reception device to receive the application data transmitted from each transmission device; the reception information providing device having: a reception information providing device communication unit configured to carry out communications with each transmission device and the reception devices; and a reception information providing device control unit configured to control the reception information providing device communication unit to receive the reception establishing information of each transmission device transmitted from each transmission device, and to transmit the reception establishing information of a specified transmission device to a prescribed reception device; and each reception device having: a reception device communication unit configured to carry out communications with each transmission device and the reception information providing device; and a reception device control unit configured to control the reception device communication unit to receive the reception establishing information of one transmission device transmitted from the reception information providing device, and to receive the application data transmitted from said one transmission device according to the reception establishing information of said one transmission device.

According to another aspect of the present invention there is provided a broadcast type service system using communications according to Bluetooth specification, the system comprising: at least one transmission device; and a plurality of reception devices; each transmission device having: a transmission device communication unit configured to carry out communications with the reception devices; and a transmission device control unit configured to control the transmission device communication unit to transmit application data to at least one reception device, and to transmit a reception establishing information of each transmission device which is necessary for a reception device to receive the application data transmitted from each transmission device; and each reception device having: a reception device communication unit configured to carry out communications with each transmission device; and a reception device control unit configured to control the reception device communication unit to receive the reception establishing information of one transmission device transmitted from said one transmission device by carrying out communications in an active mode according to the Bluetooth specification with said one transmission device, and to receive the application data transmitted from said one transmission device according to the reception establishing information of said one transmission device when communications with said one transmission device is switched from the active mode to a park mode according to the Bluetooth specification.

According to another aspect of the present invention there is provided a method for providing a broadcast type service using communications according to Bluetooth specification, the method comprising: (a) transmitting application data from each transmission device to at least one reception device; (b) transmitting from each transmission device a reception establishing information of each transmission device which is necessary for a reception device to receive the application data transmitted from each transmission device; (c) receiving the reception establishing information of each transmission device transmitted from each transmission device at a reception information providing device; (d) transmitting the reception establishing information of a specified transmission device from the reception information providing device to a prescribed reception device; (e) receiving the reception establishing information of one transmission device transmitted from the reception information providing device at one reception device; and (f) receiving the application data transmitted from said one transmission device at said one reception device according to the reception establishing information of said one transmission device.

According to another aspect of the present invention there is provided a method for providing a broadcast type service using communications according to Bluetooth specification, the method comprising: (a) transmitting application data from each transmission device to at least one reception device; (b) transmitting from each transmission device a reception establishing information of each transmission device which is necessary for a reception device to receive the application data transmitted from each transmission device; (c) receiving the reception establishing information of one transmission device transmitted from said one transmission device at one reception device by carrying out communications in an active mode according to the Bluetooth specification with said one transmission device; and (d) receiving the application data transmitted from said one transmission device at said one reception device according to the reception establishing information of said one transmission device when communications with said one transmission device is switched from the active mode to a park mode according to the Bluetooth specification.

According to another aspect of the present invention there is provided a reception information providing device in a broadcast type service system using communications according to Bluetooth specification, the reception information providing device comprising: a communication unit configured to carry out communications with each transmission device and reception devices; and a control unit configured to control the communication unit to receive a reception establishing information of each transmission device transmitted from each transmission device which is necessary for a reception device to receive application data transmitted from each transmission device, and to transmit the reception establishing information of a specified transmission device to a prescribed reception device, such that the prescribed reception device can receive application data transmitted from the specified transmission device according to the reception establishing information of the specified transmission device received from the reception information providing device.

According to another aspect of the present invention there is provided a reception device in a broadcast type service system using communications according to Bluetooth specification, the reception device comprising: a communication unit configured to carry out communications with each transmission device; and a control unit configured to control the communication unit to receive a reception establishing information of one transmission device transmitted from said one transmission device which is necessary for the reception device to receive application data transmitted from said one transmission device, by carrying out communications in an active mode according to the Bluetooth specification with said one transmission device, and to receive application data transmitted from said one transmission device according to the reception establishing information of said one transmission device when communications with said one transmission device is switched from the active mode to a park mode according to the Bluetooth specification.

Other features and advantages of the present invention will become apparent from the following description taken in conjunction with the accompanying drawings.

DETAILED DESCRIPTION OF THE INVENTION

Referring now to FIG. 1 to FIG. 7, the first embodiment of the broadcast type service system according to the present invention will be described in detail.

Figure 1:
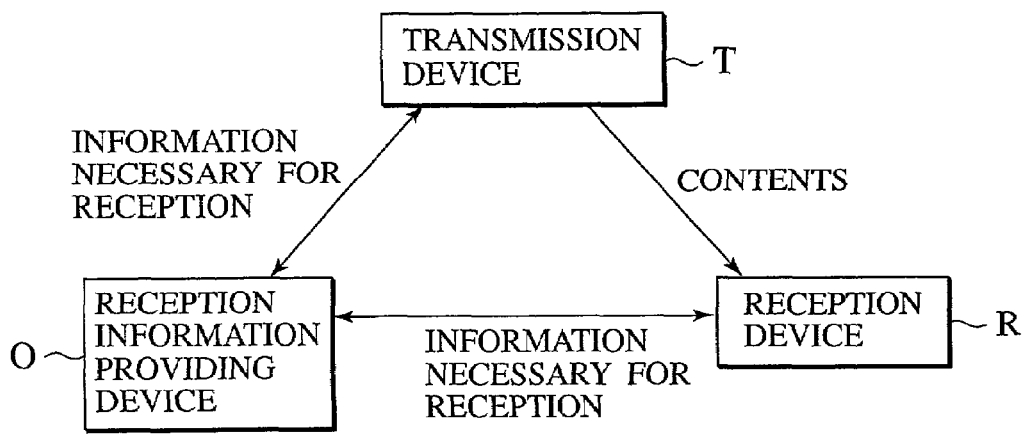
FIG. 1 is a block diagram showing an exemplary configuration of a broadcast type service system according to the first embodiment of the present invention.
Figure 2:
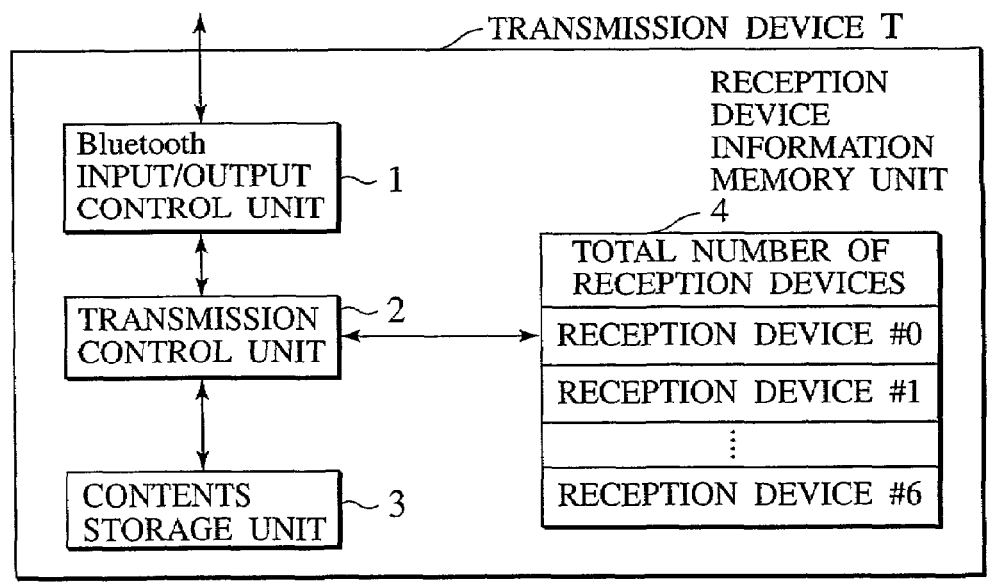
FIG. 2 is a block diagram showing an exemplary configuration of a transmission device in the broadcast type service system of FIG. 1.
Figure 3:
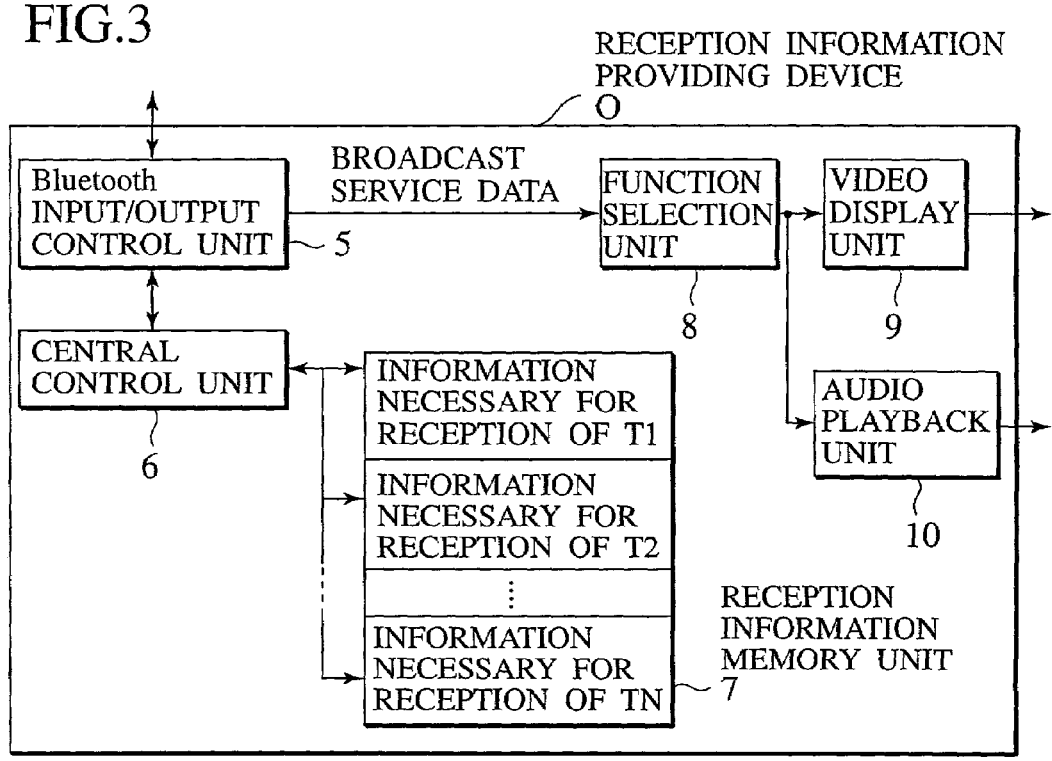
FIG. 3 is a block diagram showing an exemplary configuration of a reception information providing device in the broadcast type service system of FIG. 1.
Figure 4:
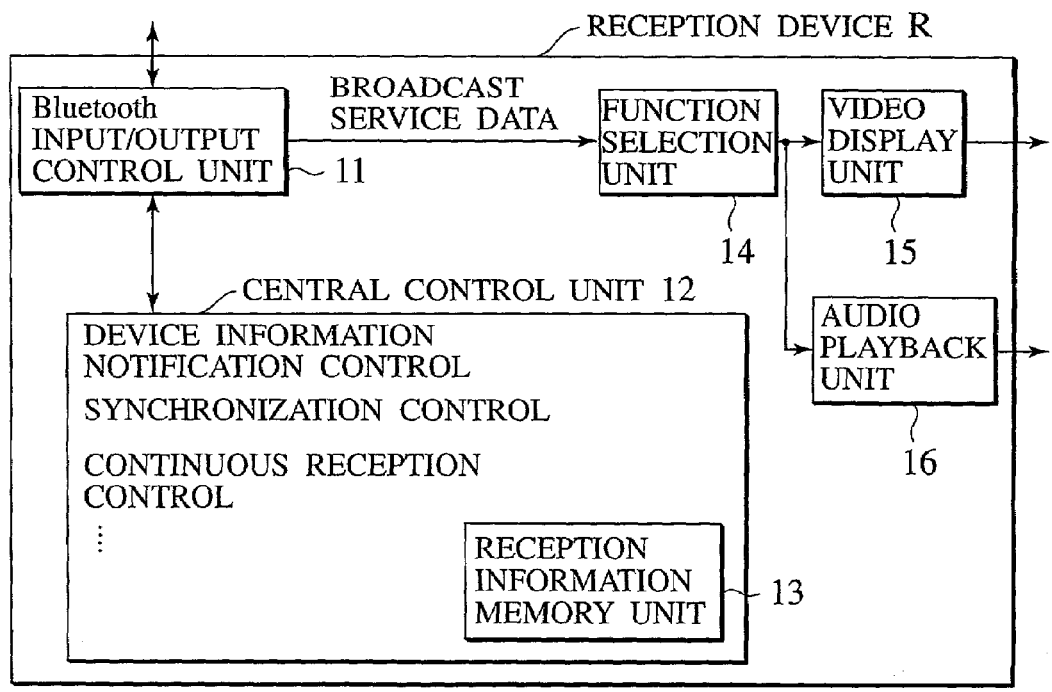
FIG. 4 is a block diagram showing an exemplary configuration of a reception device in the broadcast type service system of FIG. 1.

FIG. 1 shows an exemplary configuration of a broadcast type service system according to the first embodiment. Also, FIGS. 2 to 4 show exemplary configurations of a transmission device T, a reception information providing device O and a reception device R in the broadcast type service system of FIG. 1, respectively.

In FIG. 1, the transmission device T, the reception information providing device O and the reception device R are all Bluetooth units which have a communication function according to the Bluetooth specification. Note that FIG. 1 shows only one reception device R for the sake of simplicity, but any desired number of the reception units may be provided in the system. It is also possible to provide a plurality of the transmission devices in the system.

First, the connection method in the Bluetooth will be described, At a time of starting the connection, a device for providing the service transmits an inquiry message to a device for receiving the service in order to establish the connection. For example, the master transmits the inquiry message. In the case where the slave is in an inquiry scan state, upon receiving the inquiry message from the master, the slave returns a packet (FHS packet) containing its own Bluetooth device address (abbreviated hereafter as BD-ADDR) as an inquiry response message.

The master acquires the BD-ADDR of the Bluetooth unit that made a response by the inquiry response message, and transmits a page message containing this BD-ADDR. In response to the page message containing its own BD-ADDR, the slave transmits a page response message. As a result, the connection becomes active and the master transmits the FHS packet to the slave.

At a time of the connection, there is a need for the master and the slave to match the hopping pattern. The inquiry message from the master is changing channels according to a prescribed hopping pattern. The slave returns the inquiry response message by establishing the synchronization after a prescribed period of time. In this way, the master can recognize the slave. When the master transmits its own BD-ADDR, the slave can calculates the hopping pattern and its phase by the calculation using the BD-ADDR and the signal clock of the master. The master and the slave will carry out the communications while maintaining the synchronization by using the calculated hopping pattern. Thereafter, the slave establishes the synchronization between the master and the slave by utilizing the received FHS packet or other data packet.

In FIG. 1, the transmission device T is capable of transmitting prescribed application data (which will also be referred to as broadcast service data hereafter) according to the Bluetooth specification. The reception device R is capable of receiving the application data from the transmission device T according to the Bluetooth specification. In this case, each reception device R can make a connection and communications with the transmission device T according to the Bluetooth specification as long as the total number of the reception devices R1, R2, . . . that make connections with the transmission device T by the Bluetooth (which will be collectively referred to as reception devices R hereafter) does not exceeds a limitation according to the Bluetooth specification (which is seven due to the limitation of the active member address region in the Bluetooth Version 1.0).

Namely, each reception device R can be put in a state capable of reception by acquiring information necessary for receiving transmission signals from the transmission device T (which will be referred to as a reception establishing information hereafter), and in this way it becomes possible to receive the application data transmitted by the transmission device T.

Note that the reception establishing information includes the BD-ADDR and the clock of the transmission device T, for example. In addition, various service definitions ranging from baseband and L2CAP (Logical Link Control and Adaptation Protocol) to applications are also necessary in order to utilize the received data.

Upon receiving the BD-ADDR and the clock of the transmission device T, the reception device R calculates the channel hopping sequence (hopping pattern) and its phase by using the available information. Thereafter, the reception device R can receive the Bluetooth information packets from the transmission device T by hopping the receiving frequency according to the sequence starting from the calculated phase of the hopping pattern.

The reception device R removes baseband and L2CAP headers from the received Bluetooth information packet according to the definition of each protocol layer, decrypts the application data when the application data are encrypted, carries out the decoding processing according to the codec parameters of the application data, and extracts the application data.

However, when the total number of the reception devices R that attempt to carry out communications with the transmission device T exceeds the limit according to the Bluetooth specification, it becomes impossible to connect the transmission device T and the reception device R according to the Bluetooth specification and it becomes impossible to exchange the application data. For this reason, in this embodiment, the reception information providing device O is introduced in order to enable reception of the application data from the transmission device T regardless of the limit on the total number of the reception devices R.

The reception information providing device O is capable of providing the reception establishing information necessary in enabling the reception device R to receive signals from the transmission device T, with respect to the reception device R. Namely, in this embodiment, the reception device R acquires the reception establishing information from the reception information providing device 0 which is an entity different from the transmission device T, and becomes a state capable of receiving the transmission signals from the transmission device T according to the acquired reception establishing information, such that it becomes possible to receive the application data by receiving radio signals propagating in a radio space.

Namely, in this case, the reception device R can receive the application data transmitted by the transmission device T by utilizing a method for physically receiving radio signals while being in a non-connected state as a Bluetooth unit, i.e., without acquiring the active member address from the transmission device T.

The reception information providing device O is capable of making a connection and communications with the transmission device T as well as with the reception device R according to the Bluetooth specification. Namely, the reception information providing device O can acquire the reception establishing information necessary in making a connection with the transmission device T, by making a connection and communications with the transmission device T according to the Bluetooth specification.

The reception information providing device O has a memory which is capable of storing the reception establishing information necessary in making a connection with the transmission device T. The reception information providing device O is also capable of transmitting the stored reception establishing information to the reception device R.

The reception device R of this embodiment acquires the reception establishing information necessary in making a connection with the transmission device T, by making a connection and communications with the reception information providing device O according to the Bluetooth specification, and changes the hopping pattern and the phase by using the acquired reception establishing information. The reception device T receives the Bluetooth information packets by tuning the receiving frequency to the appropriate hopping pattern phase, and receives the application data by removing the baseband and L2CAP headers from the received information packet according to the definition of each protocol layer, decrypting the application data, and decoding the application data according to the codec parameters.

In this way, the reception device R of this embodiment is capable of intercepting the application data that are transmitted from the transmission device T with respect to the other reception device R.

According to this method, the reception device R and the transmission device T are not directly connected according to the Bluetooth specification, so that they are not subject to the limit on the total number of the reception devices.

The reception device R acquires the reception establishing information by making a connection and communications with the reception information providing device O according to the Bluetooth specification. After acquiring the reception establishing information, the reception device R may terminate the connection with the reception information providing device O.

Note that the reception information providing device O maintains the reception establishing information so that the reception information providing device O may also have a function for receiving the application data from the transmission device T by behaving as a reception device itself, apart from a function for distributing the reception establishing information to the reception devices that wish to receive information from the transmission device T. However, in the case of playing a role for providing the reception establishing information alone, the reception information providing device O may not necessarily be receiving the application data.

Note also that the transmission device T should preferably have a function for carrying out the transmission of the application data even when there is no reception device R that is connected to the transmission device T.

Note also that the reception information providing device O and the transmission device T may not necessarily be connected by the Bluetooth, and can be connected by a physical cable, for example. In such a case, it suffices for the reception information providing device O to acquire the reception establishing information by any desired method.

The reception information providing device O maintains the reception establishing information and various information necessary in effectively receiving the application data in its memory. The reception establishing information to be stored in the memory of the reception information providing device O includes the channel frequency hopping pattern and its phase that are used by the transmission device T as described above. The channel frequency hopping pattern can be calculated from information on the reception device side by using the BD-ADDR and the clock of the transmission device T.

In addition, the information to be stored in a memory of the reception information providing device O may include protocol layer structures ranging from the physical layer, baseband and L2CAP to the applications, parameters of each protocol, and information necessary in decoding the payload portion such as the encryption method, the encryption key, the video codec method, and the video codec parameters, etc.

The memory of the reception information providing device O may also store contents regarding the transmission device T that can be freely written by the transmission device T or the information provider. In addition, the memory of the reception information providing device O may also store information effective in selecting services such as service records defined by the SDP (Service Discovery Protocol) or service records that are information to be used as a key in identifying the application data from a viewpoint of the user that can be freely written by the application data providing side or the user.

Figures 5, 6:
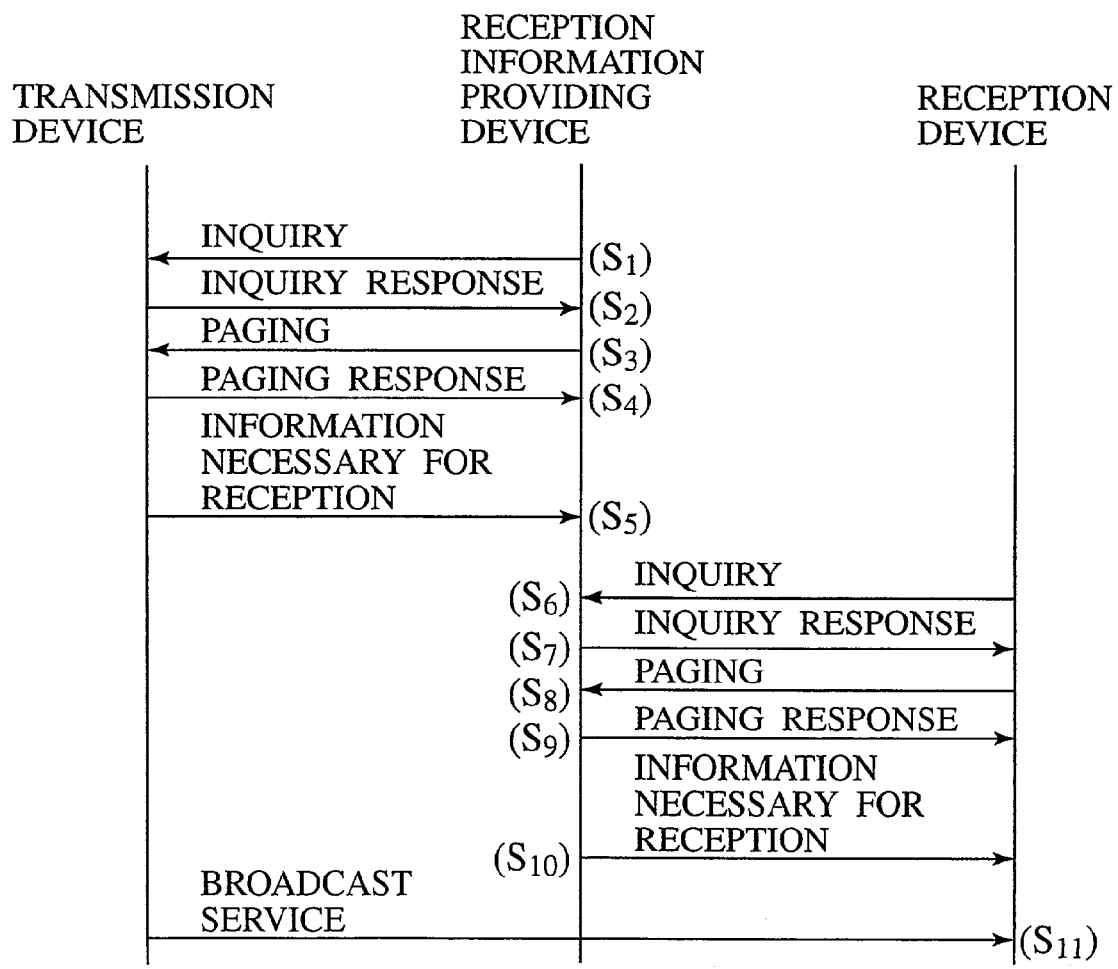
FIG. 5 is a diagram showing an exemplary packet format for storing information necessary for reception in the broadcast type service system of FIG. 1.
FIG. 6 is a sequence chart for one exemplary operation to be carried out in the broadcast type service system of FIG. 1.

FIG. 5 shows an exemplary packet format for storing such information necessary for the reception. As shown in FIG. 5, the packet format includes the BD-ADDR, the hop sequence and phase, the service records information, the codec parameters information, etc.

FIG. 2 shows an exemplary configuration of the transmission device T in the system of FIG. 1. The transmission device T shown in FIG. 2 is a device having a communication function according to the Bluetooth specification. This transmission device T has a Bluetooth input/output control unit 1, a transmission control unit 2, a contents storage unit 3, and a reception device information memory unit 4.

The Bluetooth input/output control unit 1 transmits the information from the transmission control unit 2 according to the prescribed hopping pattern from an antenna (not shown) as radio signals according to the Bluetooth specification, while extracting the information contained in radio signals received by the antenna and outputting them to the transmission control unit 2, under the control of the transmission control unit 2.

The contents storage unit 3 stores the application data (which will also be referred to as contents hereafter) of the services to be provided by the transmission device T.

The transmission control unit 2 transmits the contents to the reception devices R that have the active connection state, and supplies the information on the reception devices R that have the active connection state to the reception device information memory unit 4, in cooperation with the Bluetooth input/output control unit 1.

The reception device information memory unit 4 stores the information on each reception device R.

The transmission control unit 2 and the Bluetooth input/output control unit 1 may also be equipped with a function for transmitting the application data regardless of whether there exists any reception device R that is connected to the transmission device T according to the Bluetooth specification. They can also be provided with a function for changing the number of the reception devices R that are connected to the transmission device T according to the Bluetooth specification and the modes of the reception devices R or a function for disconnecting the connection with the reception device R, in order to carry out the mode switching or the disconnection with respect to the reception device R that is connected to the transmission device T according to the Bluetooth specification.

In addition, in this embodiment, the transmission control unit 2 and the Bluetooth input/output control unit 1 have a function for storing information regarding whether the connected reception device is a device capable of the interception or not.

FIG. 3 shows an exemplary configuration of the reception information providing device O in the system of FIG. 1. The reception information providing device O shown in FIG. 3 is a device having a communication function according to the Bluetooth specification. This reception information providing device O has a Bluetooth input/output control unit 5, a central control unit 6, a reception information memory unit 7, a function selection unit 8, a video display unit 9 and an audio playback unit 10.

The Bluetooth input/output control unit 5 is similar to the Bluetooth input/output control unit 1 of the transmission device T.

The central control unit 6 acquires various information including the reception establishing information by carrying out communications with the transmission device T.

The reception information storage unit 7 stores the information acquired by the central control unit 6.

In this embodiment, when there are a plurality of transmission devices T for providing the application data providing services, the central control unit 6 acquires various information including the reception establishing information by sequentially making a connection and communications with each transmission device T in cooperation with the Bluetooth input/output control unit 5, and the reception information memory unit 7 stores the information acquired from each transmission device T separately. The reception information memory unit 7 may store information such as the hopping pattern and phase, the encryption method, the codec parameters, etc.

When the reception device R is connected, the central control unit 6 reads out various information including the reception establishing information from the reception information memory unit 7, and transmits them to the reception device R through the Bluetooth input/output control unit 5. In this case, the central control unit 6 transmits the information on the transmission device T according to a request from the reception device R.

Note that, in the case of charging the reception device R for the contents transmitted from the transmission device T, the central control unit 6 may also have a proxy function for carrying out the charging processing including the authentication of the reception device R, the presentation of the charge information, the key notification, and the charging, for example, on behalf of one or a plurality of the transmission devices T.

Also, the Bluetooth input/output control unit 5 can receive the broadcast service data from the transmission device T. The received broadcast service data are supplied to the function selection unit 8. The function selection unit 8 separates the received broadcast data into different data types, and supplies the video data to the video display unit 9 and the audio data to the audio playback unit 10, for example.

The video display unit 9 applies the prescribed signal processing to the input video data and displays them at a display (not shown). The audio playback unit 10 applies the prescribed signal processing to the input audio data, and playbacks them at an audio player (not shown). In this way, it becomes possible to view and listen to the broadcast service data through the display and the audio player.

Note that, in the example shown in FIG. 2 and FIG. 3, the transmission device T and the reception information providing device O exchange the information through the Bluetooth, but it is also possible to use any other suitable interface instead as already mentioned above.

FIG. 4 shows an exemplary configuration of the reception device R in the system of FIG. 1. The reception device R shown in FIG. 4 is a device having a communication function according to the Bluetooth specification. This reception device R has a Bluetooth input/output control unit 11, a central control unit 12 including a reception information memory unit 13, a function selection unit 14, a video display unit 15 and an audio playback unit 16.

The Bluetooth input/output control unit 11 is similar to the Bluetooth input/output control unit 1 or 5 of the transmission device T or the reception information providing device O.

The central control unit 12 acquires various information including the reception establishing information by carrying out communications with the transmission device T, or acquires various information including the reception establishing information necessary for communications with the transmission device T, by carrying out communications with the reception information providing device O.

Namely, the central control unit 12 can carry out various controls according to the usual Bluetooth specification, as well as various controls such as the device information notification control, the synchronization control, the continued reception control, etc. Also, the central control unit 12 has the reception information memory unit 13 for storing various information including the reception establishing information necessary for communications with the prescribed transmission device T which are acquired by the communications with the reception information providing device O.

As described above, various information including the reception establishing information necessary for communications with the prescribed transmission device T may include information such as the hopping pattern and phase, the encryption method, the codec parameters, etc.

In this embodiment, in the case of attempting to receive the broadcast service data from the prescribed transmission device T, if the number of the reception devices R connected to the transmission device T is already seven, the central control unit 12 first acquires various information including the reception establishing information by carrying out communications with the reception information providing device O and stores them into the reception information memory unit 13. While storing the acquired reception establishing information, i.e., the hopping pattern and phase of the prescribed transmission device T, into the reception information memory unit 13, the central control unit 12 also carries out the synchronization control for tuning the receiving frequency to the phase of the hopping pattern.

In this way, the reception device R can intercept the radio signals of the broadcast service data transmitted by the transmission device T with respect to the other reception device R. The Bluetooth input/output control unit 11 outputs the intercepted broadcast service data to the function selection unit 14. The function selection unit 14, the video display unit 15 and the audio playback unit 16 are similar to the function selection unit 8, the video display unit 9 and the audio playback unit 10 of the reception information providing device O.

Note that, in the case where the broadcast service data are encrypted or encoded, the broadcast service data can be decrypted or decoded by reading out information such as the encryption method or the codec parameters from the central control unit 12.

The central control unit 12 also has a device information notification function for notifying the information regarding whether this reception device R itself is a device capable of intercepting the radio signals transmitted by the transmission device T with respect to the other reception device R or not, to the transmission device T.

The central control unit 12 also has a continued reception function for enabling the continued reception even when the mode is switched to the park mode or the connection according to the Bluetooth specification is disconnected from the transmission device T, by switching to the operation mode for intercepting the radio signals.

Note also that, instead of storing the hopping pattern and phase of the transmission device T at the reception information providing device O, the reception information providing device may store the BD-ADDR and the clock of the prescribed transmission device T, along with a value of the clock of the reception information providing device O itself when the reception device R has received these information, and the reception device R may calculate the hopping pattern and phase of the transmission device T from the BD-ADDR and the clock of the transmission device T that are distributed from the reception information providing device O.

Referring now to FIG. 6, an exemplary operation of the system in the above described configuration will now be described.

Suppose now that more than one transmission devices T (T1, T2, . . . ) and more than one reception devices R (R1, R2, . . . ) and the reception information providing device O are existing within the radio network area utilizing the Bluetooth. Each transmission device T can transmit its own broadcast service data.

First, the reception information providing device O establishes a connection with the transmission device T1 in order to acquire the information necessary for reception including the reception establishing information of the transmission device T (T1). The reception information providing device O establishes the connection with the transmission device T1 according to the Bluetooth specification, for example. Namely, the reception information providing device O transmits an inquiry message to the transmission device T1 (step S1). In response to this inquiry message, the transmission device T1 returns an inquiry response (step S2). In addition, the reception information providing device O transmits a page message to the transmission device T1 (step S3), and in response the transmission device T1 returns a page response to the reception information providing device O (step S4).

By establishing the connection with the transmission device T1 according to the Bluetooth specification, the reception information providing device O can acquire the reception establishing information necessary for the connection with the transmission device T1. The reception information providing device O stores the acquired reception establishing information for the transmission device T1 into the reception information memory unit 7.

In addition, the transmission device T1 transmits the other information necessary for reception to the reception information providing device O (step S5). The reception information providing device O stores the acquired information into the reception information memory unit 7.

Similarly, the reception information providing device 0 makes a connection and communications with each one of the other transmission devices T2, T3, . . . , acquires the information necessary for reception of each transmission device T2, T3, . . . , and stores them into the reception information memory unit 7. Note that the number of transmission devices T whose information necessary for reception can be stored by the reception information providing device O is dependent on a memory capacity of the reception information memory unit 7 and not dependent on the Bluetooth specification.

Note that, in the case of not carrying out communications according to the Bluetooth specification between the reception information providing device O and the transmission device Y, the reception establishing information may also be acquired as the information necessary for reception at the step S5.

Now, suppose that the user using the reception device R wishes to receive the broadcast service data from the transmission device T1. By the user operation, the reception device R attempts to establish a connection with the transmission device T1 according to the Bluetooth specification. Here, in the case where the total number of the reception devices that are already carrying out communications with the transmission device T1 has not reached to the limit according to the Bluetooth specification, it is possible for this reception device R to receive the broadcast service data from the transmission device Y1 according to the ordinary Bluetooth specification.

Next, suppose that the user using the reception device R wishes to receive the broadcast service data from the transmission device T2, and the total number of the reception devices that are already carrying out communications with the transmission device T2 has already reached to the limit according to the Bluetooth specification. In this case, the reception device R first carries out communications with the reception information providing device O in order to establish a connection with the transmission device T2.

Namely, the reception device R transmits an inquiry message to the reception information providing device O (step S6). In response to this inquiry message, the reception information providing device O returns an inquiry response (step S7). Then, the reception device R transmits a page message to the reception information providing device O (step S8), and in response the reception information providing device O returns a page response to the reception device R (step S9).

In this way, the reception device R establishes the connection with the reception information providing device O according to the Bluetooth specification. Next, the reception information providing device O transmits the information necessary for reception of the transmission device T2 to the reception device R (step S10), Upon receiving various information including the reception establishing information at the step S10, the reception device R stores the received information into the reception information memory unit 13.

Next, the reception device R calculates the channel hopping sequence (hopping pattern) and its phase which are necessary in establishing the connection with the transmission device T2, from the reception establishing information stored in the reception information memory unit 13, such as the BD-ADDR and the clock of the transmission device T2, for example. The central control unit 12 of the reception device R stores the calculated information into the reception information memory unit 13, and controls the Bluetooth input/output control unit 11 to realize the receiving frequency hopping according to the sequence starting from the phase of the hopping pattern.

In this way, the reception device R intercepts the broadcast service data transmitted by the transmission device T2 with respect to the other reception device (step S11). The reception device R extracts the application data from the information packets of the intercepted broadcast service data according to the information stored in the reception information memory unit 13, by removing the baseband and L2CAP headers according to the definition of each protocol layer, decrypting the application data and decoding the application data according to the codec parameters.

The function selection unit 14 of the reception device R supplies the video data among the application data to the video display unit 15, and the audio data to the audio playback unit 16. In this way, using the video signals outputted from the video display unit 15 and the audio signals outputted from the audio playback unit 16, the broadcast service data transmitted by the transmission device T2 can be viewed and listened to at a display and an audio player of the reception device R.

As described, in this embodiment, the information necessary for each reception device in the radio network area in establishing a connection and carrying out communications with the transmission device is acquired and stored by the reception information providing device, and each reception device acquires the information necessary for establishing a connection and carrying out communications with the transmission device from the reception Information providing device, so that even when the number of the reception devices connected to the transmission device has reached to the limit according to the Bluetooth specification, it is still possible for each reception device to receive the desired service by intercepting the transmission signals of the desired transmission device.

Figure 7:
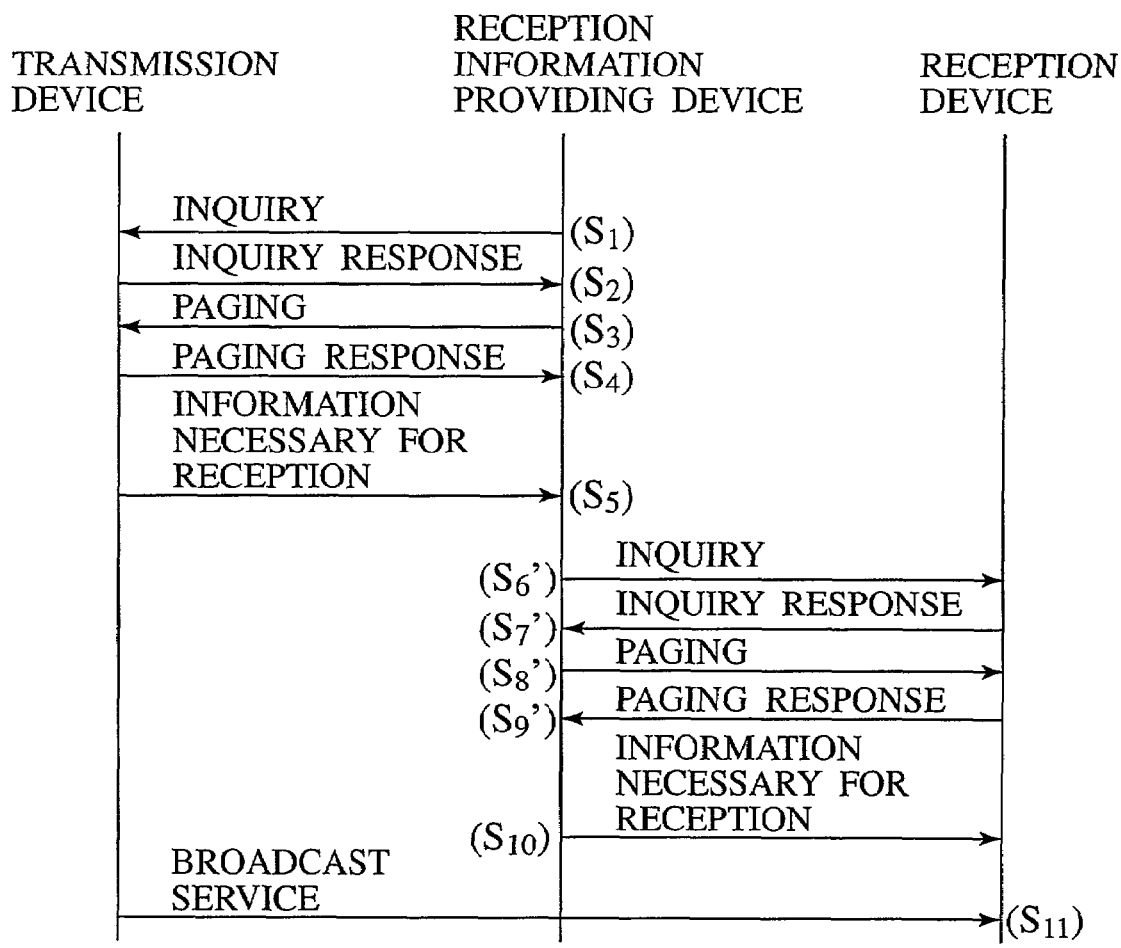
FIG. 7 is a sequence chart for another exemplary operation to be carried out in the broadcast type service system of FIG. 1.

Note that the example of FIG. 6 is directed to the case where an inquiry message is transmitted from the reception device R side to the reception information providing device O in the radio network area, but it is also possible to transmit an inquiry message from the reception information providing device O to each reception device R instead. FIG. 7 shows an exemplary operation in this case.

FIG. 7 differs from FIG. 6 in that the steps S6 to S9 of FIG. 6 are replaced by the steps S6' to S9', where the steps S6' to S9' differ from the steps S6 to S9 in that the sender and the receiver are reversed. It should be apparent that, even in this case, each reception device R can acquire the information necessary for reception of transmission signals from the desired transmission device T.

Note that the above description is directed to the case where the reception device R acquires the reception establishing information from the reception information providing device O when the total number of the reception devices already carrying out communications with the transmission device T has reached the limit according to the Bluetooth specification, but it is also possible to modify this embodiment such that the reception device R acquires the reception establishing information from the reception information providing device O from the beginning, regardless of the limit on the number of the reception devices R that can be connected to the transmission device T.

In this case, the reception device R will be intercepting the transmission signals from the transmission device T so that it is necessary for the transmission device T to always carry out communications with at least one reception device. Namely, in the case where the reception information providing device O does not function as a reception device for receiving information from the transmission device T, the transmission device T should be provided with a function for transmitting the broadcast service data regardless of whether there is a reception device or not.

Figure 8:
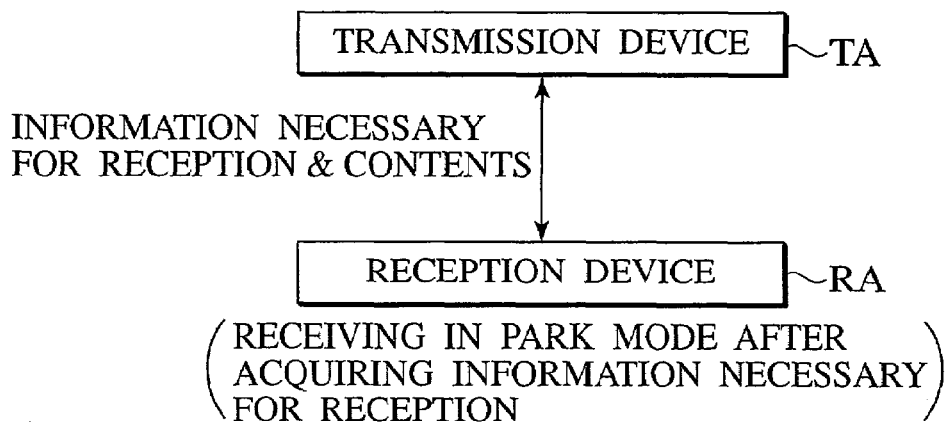
FIG. 8 is a block diagram showing an exemplary configuration of a broadcast type service system according to the second embodiment of the present invention.
Figure 9:
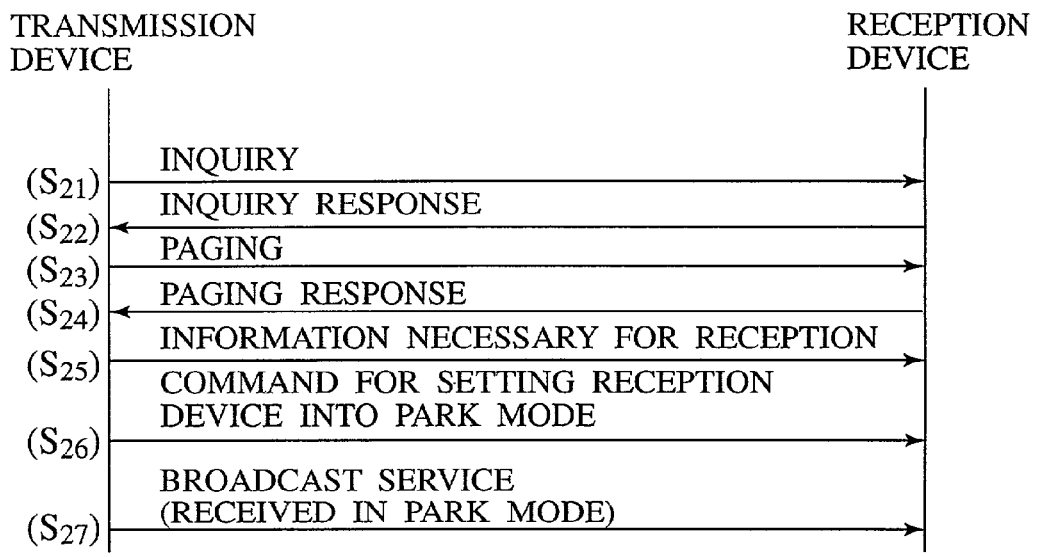
FIG. 9 is a sequence chart for one exemplary operation to be carried out in the broadcast type service system of FIG. 8.

Referring now to FIG. 8 and FIG. 9, the second embodiment of the broadcast type service system according to the present invention will be described in detail.

FIG. 8 shows an exemplary configuration of a broadcast type service system according to the second embodiment. In this embodiment, the limitation on the number of reception devices that can be connected to the transmission device according to the Bluetooth specification is circumvented by utilizing the park mode which is one of the connection states available in the Bluetooth. Because of this feature, it is possible to omit the reception information providing device in this embodiment.

In the Bluetooth, the slave in the park mode state will not be counted in the number of slaves connected to the master, and this embodiment utilizes this fact. In FIG. 8, a transmission device TA has a configuration similar to that of the transmission device T of FIG. 2, which differs from the transmission device T of the first embodiment in that a transmission control unit is capable of switching the reception device whose connection state has become active into the park mode by utilizing a LMP_park command immediately after the connection state became active.

A reception device has functions similar to those of a device according to the ordinary Bluetooth specification, but differs from a device according to the ordinary Bluetooth specification in that it is possible to intercept the radio signals from the transmission device TA even after it is switched into the park mode, by tuning the receiving frequency to the hopping pattern and the phase of the transmission device TA with respect to which the connection state is set as the park mode. Note that the reception device RA itself is also capable of switching the connection state into the park mode similarly as a device according to the ordinary Bluetooth specification.

Note that FIG. 8 shows one transmission device and one reception device alone for the sake of simplicity, but it is also possible to use a radio network having a plurality of transmission devices and reception devices.

Referring now to FIG. 9, an exemplary operation of the system in the above described configuration will now be described.

In FIG. 9, the steps S21 to S24 are a procedure for establishing a connection according to the ordinary Bluetooth specification. Namely, the transmission device TA transmits an inquiry message, and the reception device RA returns an inquiry response. Then, the transmission device TA transmits a page message, and the reception device RA returns a page response. In this way, a connection is established between the transmission device TA and the reception device RA so that it becomes possible to carry out communications between them.

Next, the transmission device TA transmits the information necessary for reception of the application data to the reception device RA (step S25).

Note that FIG. 9 is directed to an exemplary case where the inquiry message is transmitted from the transmission device TA, but it should be apparent that it is also possible to transmit the inquiry message from the reception device RA.

When the reception device RA acquires all the information necessary for reception of the application data including the reception establishing information, the transmission device TA transmits an LMP_park command to the reception device RA so as to switch the reception device RA into the park mode (step S26).

Note that the switching into the park mode may be realized by transmitting an LMP_park_req command from the reception device RA to the transmission device TA and transmitting an LMP_park command from the transmission device TA to the reception device RA in response. In this case, the transmission device TA can be a device according to the ordinary Bluetooth specification which as no function for switching the reception device into the park mode immediately after the connection state became active.

The reception device RA intercepts the radio signals transmitted by the transmission device TA into the space by hopping the receiving frequency according to the sequence starting from the appropriate phase of the appropriate hopping pattern after being switched into the park mode (step S27). Thereafter, the viewing and listening of the intercepted broadcast service data are carried out similarly as in the reception device according to the ordinary Bluetooth specification.

As described, in this embodiment, the reception device receives the broadcast service data by intercepting the transmission signals from the transmission device, in the park mode state, so that it is possible to utilize the broadcast service without being subjected to the limitation on the total number of the reception devices that can be connected to the transmission device.

Note that, even in this embodiment, the transmission device TA should preferably have a function for transmitting the application data regardless of whether there is a reception device whose connection state is active or not.

Figure 10:
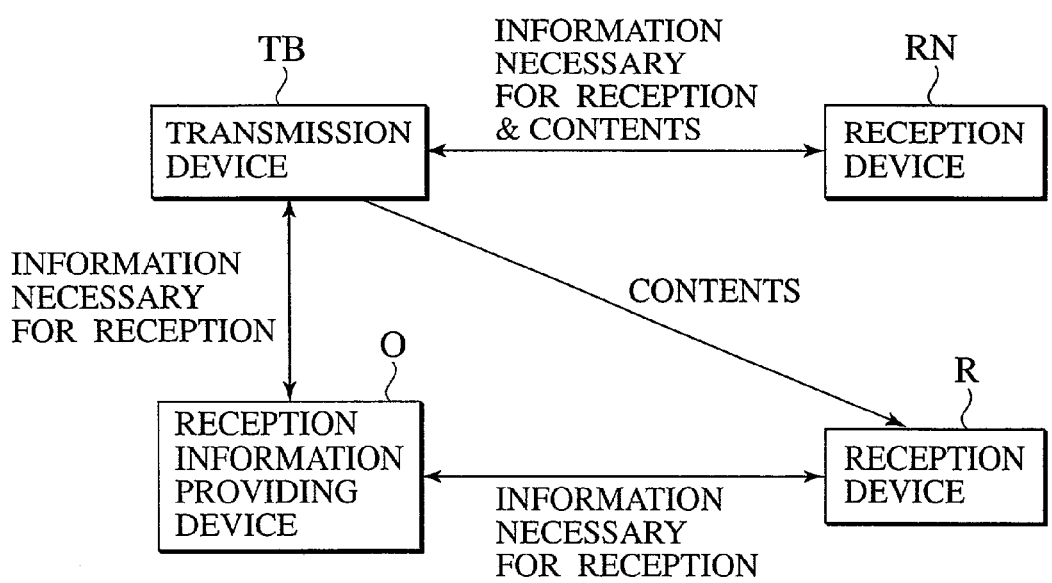
FIG. 10 is a block diagram showing an exemplary configuration of a broadcast type service system according to the third embodiment of the present invention.

Referring now to FIG. 10, the third embodiment of the broadcast type service system according to the present invention will be described in detail.

FIG. 10 shows an exemplary configuration of a broadcast type service system according to the third embodiment. In FIG. 10, those elements which are substantially similar to the corresponding elements appearing in FIG. 1 and FIG. 8 are given the same reference numerals and their description will be omitted.

In FIG. 10, the reception information providing device O and the reception device R have the similar configuration and functions as those shown in FIG. 3 and FIG. 4, respectively, whereas a reception device RN is a reception device according to the ordinary Bluetooth specification.

A transmission device TB in this embodiment has a configuration similar to that of FIG. 2, but differs from the transmission device T of FIG. 2 in that a transmission control unit also carries out a processing according to the function of the reception device. Namely, the transmission device TB maintains information on the number of the reception devices connected to it according to the Bluetooth specification and their modes, as well as information as to whether each reception device is capable of receiving the broadcast service data transmitted from the transmission device TB by intercepting the transmission signals, in a memory (not shown). The transmission device TB also has a function for executing a processing to switch the mode of the connected reception device or to disconnect the connected reception device when the total number of the connected reception devices exceeds the Bluetooth specification, by reading out the information maintained in the memory.

Next, an exemplary operation of the system in the above described configuration will now be described.

The reception device that attempts to receive the service from the transmission device TB makes an access to the transmission device TB either by transmitting an inquiry message to the transmission device TB or by responding to an inquiry message from the transmission device TB.

The transmission device TB reads out the information on the reception device from the memory, and when it is found out that this reception device is a device that cannot intercept the transmission signals even when the reception establishing information such as the hopping pattern of the transmission device TB is provided to this reception device, or when the total number of the reception devices connected to the transmission device TB according to the Bluetooth specification does not exceed the limit according to the Bluetooth specification, the transmission device TB make a connection with the reception device according to the Bluetooth specification. Consequently, the reception device RN of the ordinary Bluetooth specification will receive the application data from the transmission device TB according to the Bluetooth specification.

In the case where the total number of the reception devices connected to the transmission device TB has already reached to the limit according to the Bluetooth specification, such as when the transmission device TB does not respond to the inquiry message, for example, the reception device R first makes an access to the reception information providing device O to acquire the information necessary for a connection and communications, and intercepts the application data transmitted from the transmission device TB by utilizing the acquired information.

However, in the case where the reception device R is connected to the transmission device TB according to the Bluetooth specification, the remaining number of the reception devices that can be connected to the transmission device will be reduced. For this reason, the transmission device TB reads out the information maintained in the memory and when it is found out that the reception device currently connected to the transmission device TB is the reception device R which is capable of intercepting the transmission signals, or when it is found out that it is the reception device RA of FIG. 8 which is capable of intercepting the transmission signals in the park mode, the transmission device TB switches this reception device into the disconnected state or the park mode.

In this way, the remaining number of the reception devices RN according to the ordinary Bluetooth specification that can be connected to the transmission device TB can be increased, so that it becomes possible to switch another reception device RN according to the Bluetooth specification which is incapable of intercepting the broadcast service data into the state capable of making a connection according to the ordinary Bluetooth specification (which will be referred to as an active mode hereafter).

As described, in this embodiment, the transmission device changes the connection state of the reception device according to the information on the reception device such that the reception device capable of intercepting the transmission signals will receive the broadcast service by the interception, so that it becomes possible to increase the number of the reception devices RN to which the broadcast service can be provided.

Note that, in this embodiment, at least the reception device R (or the reception device RA) needs to have a function for notifying the transmission device TB that it is a device capable of receiving the broadcast service by the interception. There is also a need to provide a function for switching the operation into that using the interception when this device is switched from the connected state according to the ordinary Bluetooth specification into the park mode or the disconnected state.

Figure 11:
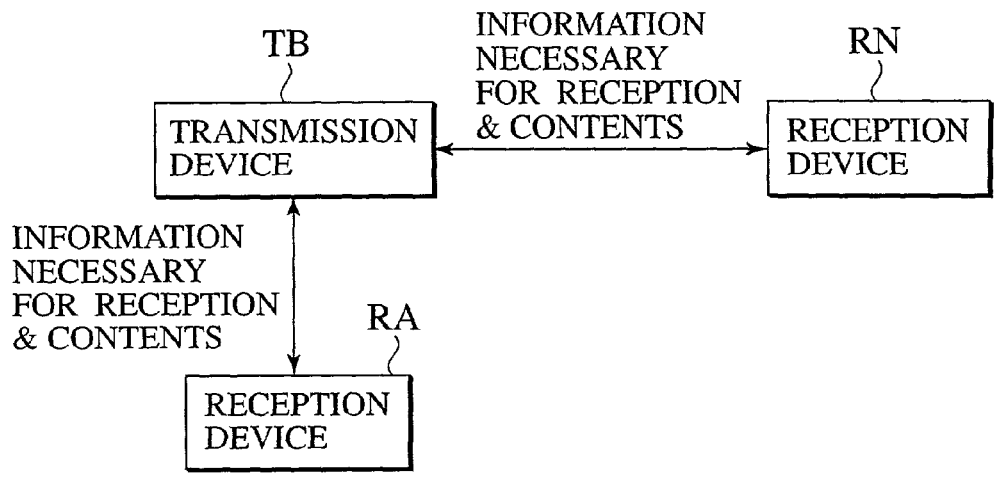
FIG. 11 is a block diagram showing an exemplary configuration of a broadcast type service system according to the fourth embodiment of the present invention.

Referring now to FIG. 11, the fourth embodiment of the broadcast type service system according to the present invention will be described in detail.

FIG. 11 shows an exemplary configuration of a broadcast type service system according to the fourth embodiment. In FIG. 11, those elements which are substantially similar to the corresponding elements appearing in FIG. 8 and FIG. 10 are given the same reference numerals and their description will be omitted.

This embodiment is directed to the case of the radio network area in which the reception device capable of intercepting communications in the park mode and the reception device according to the ordinary Bluetooth specification are coexisting.

The transmission device TB maintains information on each reception device in a memory (not shown) and functions to increase the remaining number of the reception devices that are capable of reception in the active mode. Namely, after the transmission device TB makes a connection and communication with the reception device RA according to the ordinary Bluetooth specification and transmits the reception establishing information to the reception device RA, the transmission device TB sets the reception device RA into the park mode. In this way, the number of the reception devices RN according to the ordinary Bluetooth specification that can be connected to the transmission device TB is increased.

For example, when the transmission device TB stops accepting the reception device in the active mode, the transmission device TB switches at least one reception device into the park mode such that the transmission device TB is always capable of accepting at least one reception device.

The rest of the configuration and the operation of the system shown in FIG. 11 are the same as the system shown in FIG. 10.

Figure 12:
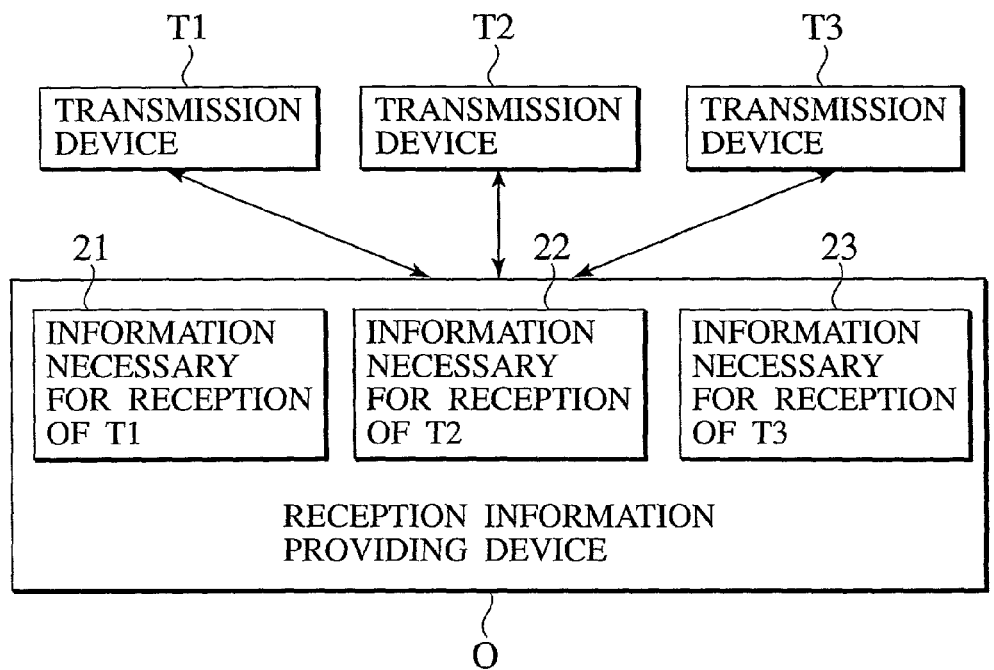
FIG. 12 is a block diagram showing a possible modified configuration of a reception information providing device in the broadcast type service system of-the present invention.

Now, the reception information providing device O of the above embodiments is capable of storing the reception establishing information and the like of a plurality of transmission devices. FIG. 12 shows an exemplary case of storing the reception establishing information and the like of three transmission devices T1, T2 and T3 at a single reception information providing device O.

The reception information providing device O has memories 21, 22 and 23 for storing the reception establishing information and the like of the transmission devices T1, T2 and T3, and stores the information acquired by carrying out communications with the transmission devices T1, T2 and T3 into the memories 21, 22 and 23, respectively. Also, the reception information providing device O reads out the contents stored in the memories 21, 22 and 23 and transmits them according to the request from the reception device.

Note that the transmission device and the reception information providing device may be provided in one-to-one correspondence or in multiple-to-one correspondence.

Now there are many possible applications of the above embodiments. For example, it is possible to carry out the charging processing with respect to the broadcast service as already mentioned above.

Namely, in the case of charging the contents transmitted by the transmission device, it is possible to carry out the charging processing by implementing a charging mechanism into each transmission device, or it is possible to carry out the charging processing at the reception information providing device on behalf of one or a plurality of transmission devices.

In the latter case, the reception device makes a connection with the reception information providing device according to the Bluetooth specification, and carries out the authentication of the reception device. Then, when the charging information is presented, the reception device selects the desired transmission contents, agrees with the payment of the fee for the selected contents, and receives the notification of the reception establishing information including the key after the charging processing is completed.

Also, the broadcast service system of the above embodiments can be utilized for various purposes.

For example, the Bluetooth can be utilized in the exhibition in which a large space such as a gymnasium is partitioned into many small booths in which each participating company makes demonstrations of their products. In such an exhibition, if the speech for describing a product is outputted from each booth freely, it becomes difficult to listen to the speech coming from each booth clearly because of the speeches coming from the other booths.

In such a case, the speech of each booth can be broadcast through the Bluetooth and received by a headphone according to the Bluetooth specification such that each user can listen to the speech of the desired booth by utilizing the headphone. By providing a switch for selecting a booth on the headphone (selecting a channel), it becomes possible to listen to the speech from the desired booth not only within that booth but also at another booth within the radio network area, without being bothered by the speeches from the other booths.

However, if the transmission device and the reception device (headphone) according to the ordinary Bluetooth specification are employed, it would be possible to broadcast the speech of one booth only to at most seven persons. In contrast, in the case of utilizing the broadcast type service system of the above embodiments, there is no limit for the total number of the audience so that it is possible to provide the speech of each booth to any users who wish to listen to it.

Now, the reception device R can calculate the hopping pattern and phase of the transmission device T from the BD-ADDR and the clock of the transmission device T as already mentioned above. In the following, the method for supplying the BD-ADDR and the clock of the transmission device T to the reception device R will be described.

First, the case where the transmission device T and the reception information providing device O are connected according to the Bluetooth specification will be described. In this case, the reception information providing device O stores the BD-ADDR of the transmission device T as notified by the FHS packet from the transmission device T.

Also, the reception information providing device O temporarily stores a difference between the clock of the transmission device T as notified by the FHS packet and the clock of the reception information providing device O itself (which will be referred to as a clock offset hereafter) and updates the clock offset whenever there is a packet transmission from the transmission device T so as to always maintain the latest clock offset.

In this case, the reception information providing device O transmits the following three pieces of information (A1), (A2) and (A3) to the reception device R.

(A1) The BD-ADDR of the transmission device T.

(A2) The clock offset CKT-O between the transmission device T and the reception information providing device O.

(A3) The clock CKO of the reception information providing device O at a time of providing the information to the reception device R.

Figure 13:
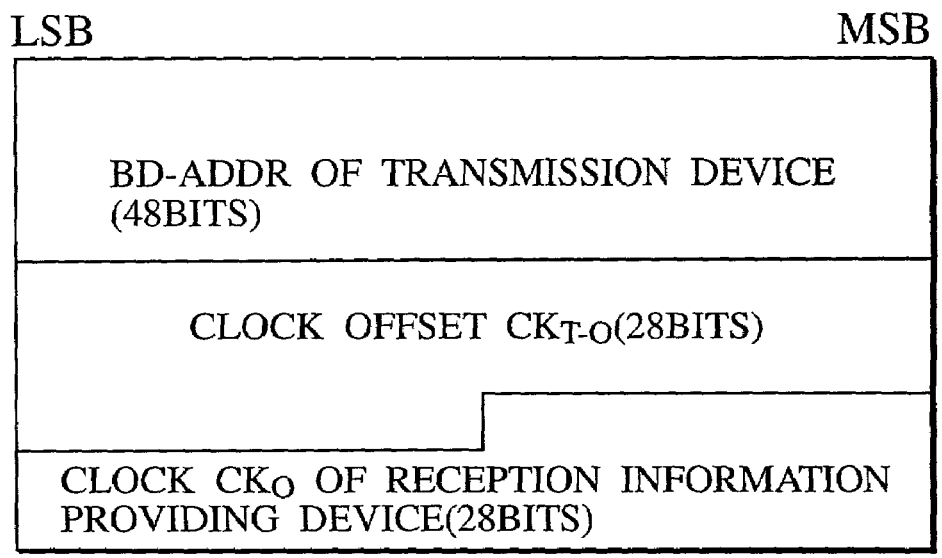
FIG. 13 is a diagram showing one exemplary information to be transmitted from a reception information providing device to a reception device in the broadcast type service system of the present invention.

FIG. 13 shows an exemplary way of transmitting these three pieces of information (A1), (A2) and (A3). As shown in FIG. 13, the reception information providing device O arranges the BD-ADDR of the transmission device T in 48 bits, then arranges the clock offset CKT-O in 28 bits, then arranges the clock CKO in 28 bits, and transmit them to the reception device R.

Note that the arrangement of the information within the packet shown in FIG. 13 is only an example, and the order of arranging these pieces of information and the number of bits to be used are not necessarily limited to those shown in FIG. 13. For example, the number of bits to be used for each information may be set smaller than that used in the example of FIG. 13.

On the other hand, the reception device R can ascertain the current clock CKT of the transmission device T by adding the clock CKO of the reception information providing device O at a time of providing the information and the clock offset CKT-O. Namely, the clock CKT is given by CKT=CKT-O+CKO. In addition, the BD-ADDR of the transmission device T is also provided from the reception information providing device O so that the reception device R can calculate the hopping pattern and phase of the transmission device T from these information.

Note that the reception device R may not necessarily calculate the hopping pattern and phase of the transmission device T as soon as the above information (A1), (A2) and (A3) are received. For this reason, the reception device R calculates and maintains the clock offset CKT-R between the transmission device T and the reception device R by using the clock CKR of the reception device R itself at a time of receiving the information from the reception information providing device O. Here, the clock offset CKT-R is given by CKT-R=CKT-O+CKO−CKR.

In the case of calculating the hopping pattern and phase of the transmission device T, the clock CKT of the transmission device T at that point is calculated by using the clock CKR of the reception device R at that point, the clock offset CKT-O between the transmission device T and the reception information providing device O, and the clock offset CKT-R between the transmission device T and the reception device R. Then, the hopping pattern and phase of the transmission device T are calculated by using the calculated clock CKT and the BD-ADDR of the transmission device T.

In this way, by notifying the information (A1), (A2) and (A3) from the reception information providing device O to the reception device R, it becomes possible for the reception device R to calculate the hopping pattern and phase of the transmission device T.

Now, as already mentioned above, there is a limit to the number of terminals that can be connected to the transmission device T according to the Bluetooth specification. Consequently, the reception information providing device O is not necessarily always capable of being connected to the transmission device T according to the Bluetooth specification. Next, the case where the reception information providing device O that was connected to the transmission device T according to the Bluetooth specification is not connected to the transmission device T at present will be described.

In this case, the reception information providing device O stores the information acquired from the transmission device T in the past. Even though the reception information providing device O is not connected to the transmission device T according to the Bluetooth specification at present, the reception information providing device O provides the information acquired from the transmission device T in the past to the reception device R.

Namely, while the reception information providing device O is connected to the transmission device T according to the Bluetooth specification, the reception information providing device O stores the BD-ADDR of the transmission device T and the clock CKTB of the transmission device T at a time of this connection as notified by the FHS packet, as well as the clock CKOB of the reception information providing device O itself at that point. Note that the reception information providing device O may acquire these information according to its own protocol.

In this case, the reception information providing device O transmits the following four pieces of information (B1), (B2), (B3) and (B4) to the reception device R.

(B1) The BD-ADDR of the transmission device T.
(B2) The clock CKTB of the transmission device T.
(B3) The clock CKOB of the reception information providing device O at a time of acquiring the clock CKTB.
(B4) The clock CKO of the reception information providing device O at a time of providing the information to the reception device R.

Figure 14:
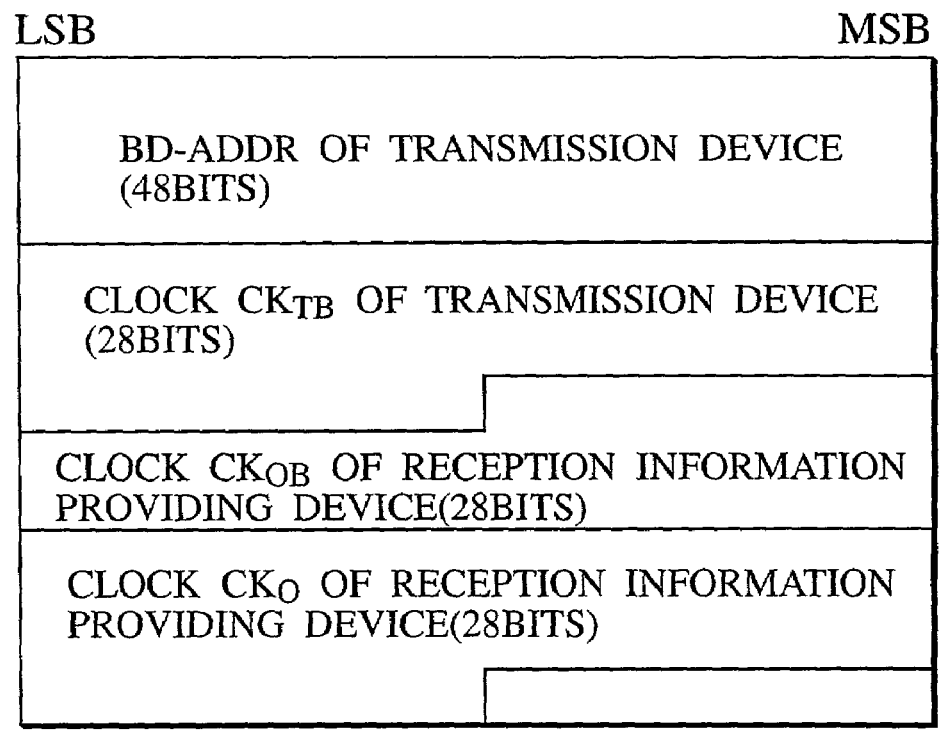
FIG. 14 is a diagram showing another exemplary information to be transmitted from a reception information providing device to a reception device in the broadcast type service system of the present invention.

FIG. 14 shows an exemplary way of transmitting these four pieces of information (B1), (B2), (B3) and (B4). As shown in FIG. 14, the reception information providing device O arranges the BD-ADDR of the transmission device T in 48 bits, then arranges the clock CKTB of the transmission device T at a time of the past connection in 28 bits, then arranges the clock CKOB of the reception information providing device O at a time of the past connection, then arranges the clock CKO in 28 bits, and transmit them to the reception device R.

Note that the arrangement of the information within the packet shown in FIG. 14 is only an example, and the order of arranging these pieces of information and the number of bits to be used are not necessarily limited to those shown in FIG. 14. For example, the number of bits to be used for each information may be set smaller than that used in the example of FIG. 14.

In this case, the reception device R obtains the clock offset CKT-O (=CKTB−CKOB) between the transmission device T and the reception information providing device O from the clock CKTB acquired when the reception information providing device O was connected to the transmission device T and the clock CKOB at that point. In addition, the reception device R obtains the current clock CKT (=CKTB−CKOB+CKO) of the transmission device T by adding the calculated clock offset CKT-O to the clock CKO of the reception information providing device O as acquired by making a connection with the reception information providing device O.

The subsequent operation is the same as in the example described above, and the reception device R calculates the hopping pattern and phase of the transmission device T by using the calculated clock CKT and the BD-ADDR of the transmission device T provided from the reception information providing device O.

Also, as the reception device R calculates and maintains the clock offset CKT-R nd the reception device R, it is possible to calculate the hopping pattern and phase of the transmission device T at a prescribed timing similarly as in the example described above.

Next, the case where the transmission device T and the reception information providing device O are connected by a method other than that of the Bluetooth specification will be described.

When the transmission device T and the reception information providing device O are connected by a method other than that of the Bluetooth specification, as in the case where the transmission device T and the reception information providing device O are connected by a cable, for example, there can be cases where the BD-ADDR and the clock of the transmission device T are unnecessary for communications between the transmission device T and the reception information providing device O.

For this reason, the reception information providing device O receives the information on the BD-ADDR and the clock of the transmission device T directly from the transmission device T by some method such as its own protocol.

Then, the reception information providing device O stores the information received from the transmission device T along with the clock of the reception information providing device O itself at a time of receiving the information from the transmission device T.

In this case, the reception device R can calculate the hopping pattern and phase of the transmission device T by the same processing as in the case of receiving the above information (A1), (A2) and (A3).

It is also possible for the reception information providing device O to directly receive and store a difference between the clock of the transmission device T and the clock of the reception information providing device O itself at a time of receiving the information, as the clock offset by some method such as its own protocol, instead of receiving the clock of the transmission device T.

In this case, the reception device R can calculate the hopping pattern and phase of the transmission device T by the same processing as in the case of receiving the above information (B1), (B2), (B3) and (B4).

As described, the reception device R can receive the transmission contents of the transmission device T by using the BD-ADDR and the clock of the transmission device T. However, in order to receive an upper level service from the transmission contents intercepted by the reception device R, there is a need for a preparation to accept an upper level service specification on the reception device R side.

For this reason, the reception information providing device O can check the service specification of the reception device R at a time of providing the reception establishing information to the reception device R. Here, the service specification includes a protocol and a profile used at an upper layer.

By checking the service specification in advance, it is possible to prevent a wasteful data transmission in the case where the reception device R is incapable of utilizing the service of the transmission device T.

Figure 15:
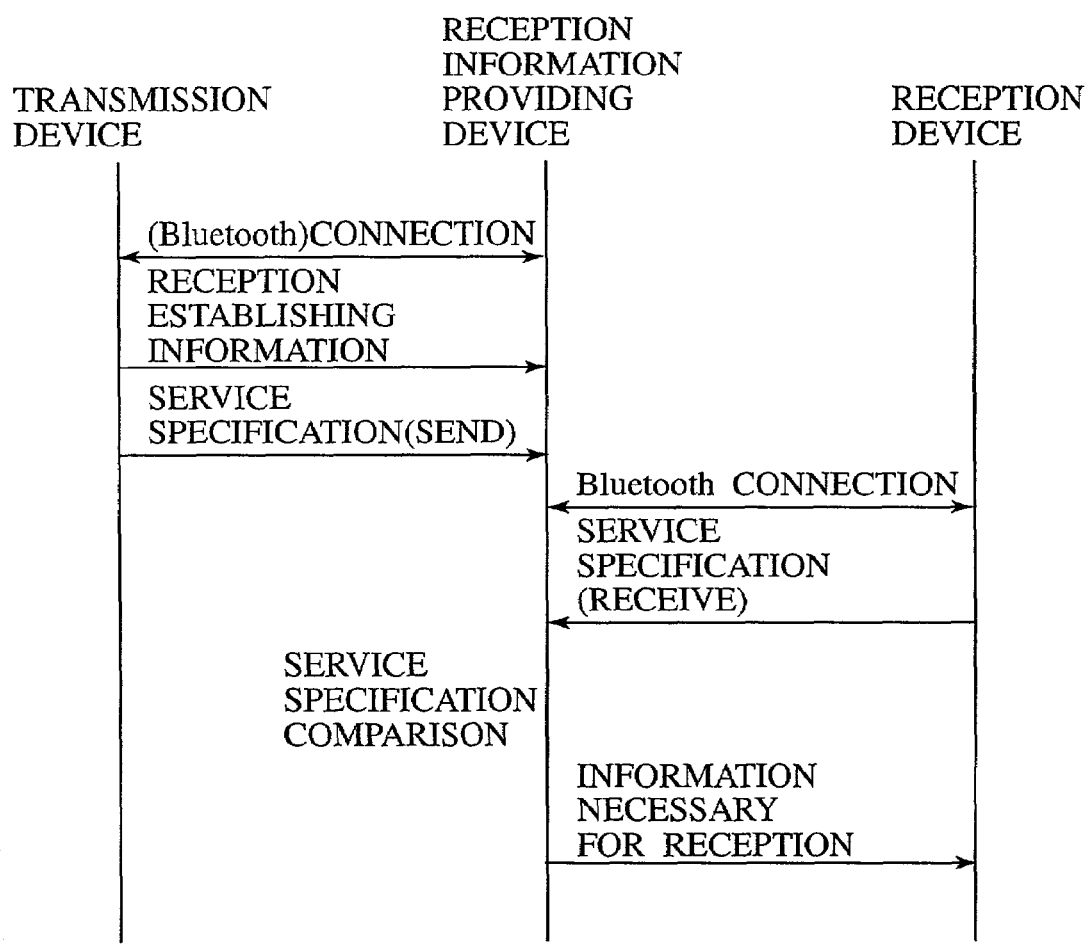
FIG. 15 is a sequence chart for another exemplary operation to be carried out in the broadcast type service system of the present invention.

FIG. 15 shows the exemplary information exchange procedure up to the interception in this case. As shown in FIG. 15, after the reception information providing device O carries out communications with the transmission device T according to the Bluetooth specification and acquires the reception establishing information, the reception information providing device O acquires the service specification provided by the transmission device T by using the SDP or the like from the transmission device T.

Then, before transmitting the information on the BDADDR and the clock of the transmission device T to the reception device R, the reception information providing device O acquires the service specification that is acceptable to the reception device R by using the SDP or the like from the reception device R. Then, the reception information providing device O compares the service specification provided by the transmission device T with the service specification acceptable to the reception device R, and judges whether the service provided by the transmission device T is acceptable to the reception device R or not.

When the reception device R is capable of accepting the service of the transmission device T, the reception information providing device O transmits details of the service specification to the reception device R in addition to the BD-ADDR and the clock of the transmission device T. On the other hand, when the reception device R is not capable of accepting the service of the transmission device T, the reception information providing device O does not provide the information to the reception device R. In this way, it is possible to prevent a wasteful data transmission.

As described, according to the present invention, it is possible to provide the broadcast type service with respect to a sufficient number of devices regardless of the limitation on the number of devices that can be connected in the point-to-multipoint connection.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A broadcast type service system comprising:
   at least one transmission device;
   a reception information providing device; and
   a plurality of first reception devices;
   a plurality of second reception devices;
   each transmission device having:
      a transmission device communication unit configured to carry out communications with the reception information providing device and the first reception devices; and
      a transmission device control unit configured to control the transmission device communication unit to transmit application data to at least one first reception device and to transmit a reception establishing information of each transmission device which is necessary for a first reception device to receive the application data transmitted from each transmission device;
   the reception information providing device having:
      a reception information providing device communication unit configured to carry out communications with each transmission device and the second reception devices; and
      a reception information providing device control unit configured to control the reception information providing device communication unit to receive the reception establishing information of each transmission device transmitted from each transmission device, and to transmit the reception establishing information of a specified transmission device to a prescribed second reception device; and
   each second reception device having:
      a reception device communication unit configured to carry out communications with each transmission device and the reception information providing device; and
      a reception device control unit configured to control the reception device communication unit to receive the reception establishing information of one transmission device transmitted from the reception information providing device, and to intercept the application data, which is transmitted from said one transmission device to at least one first reception device according to a Bluetooth specification, according to the reception establishing information of said one transmission device without connecting said each second reception device as a first reception device according to the Bluetooth specification with said one transmission device.

2. The system of claim 1, wherein the reception information providing device also has a memory unit configured to store the reception establishing information received by the reception device communication unit.

3. The system of claim 1, wherein the reception information providing device also has a plurality of memory units configured to separately store the reception establishing information of a plurality of transmission devices received by the reception device communication unit.

4. The system of claim 1, wherein the reception information providing device control unit is also configured to acquire a service specification of a service provided by each transmission device from each transmission device, compare the service specification of the specified transmission device with a specification of service acceptable to the prescribed reception device, and control the reception information providing device communication unit to transmit the reception establishing information of the specified transmission device to the prescribed second reception device only when the service specification of the specified transmission device is acceptable to the prescribed second reception device.

5. The system of claim 1, wherein the transmission device control unit of each transmission device is also configured to control the transmission device communication unit to transmit the application data even when there is no reception device that is carrying out communications with each transmission device in an active mode according to the Bluetooth 1.0 specification.

6. The system of claim 1, wherein the reception device control unit is also configured to control the reception device communication unit to receive the application data, which is transmitted from said one transmission device according to the Bluetooth specification, according to the reception establishing information of said one transmission device without connecting said each second reception device as a first reception device according to the Bluetooth specification with said one transmission device, only when communications in an active mode according to the Bluetooth specification cannot be carried out with said one transmission device.

7. The system of claim 1, wherein the reception device communication unit receives the reception establishing information that indicates a hopping pattern and a phase of said one transmission device.

8. The system of claim 1, wherein the reception device communication unit receives the reception establishing information that indicates a Bluetooth device address and a clock of said one transmission device.

9. The system of claim 1, wherein the reception information providing device communication unit transmits the reception establishing information of the specified transmission device that indicates a Bluetooth device address of the specified transmission device, a clock offset between the specified transmission device and the reception information providing device, and a clock of the reception information providing device at a time of transmitting the reception establishing information to the prescribed second reception device.

10. The system of claim 1, wherein the reception information providing device communication unit transmits the reception establishing information of the specified transmission device that indicates a Bluetooth device address of the specified transmission device, a clock of the specified transmission device at a time of transmitting the reception establishing information from the specified transmission device to the reception information providing device, a clock of the reception information providing device at a time of receiving the reception establishing information from the specified transmission device, and a clock of the reception information providing device at a time of transmitting the reception establishing information to the prescribed second reception device.

11. The system of claim 1, wherein the reception information providing device communication unit receives the reception establishing information of each transmission device by carrying out communications according to the Bluetooth specification with each transmission device.

12. The system of claim 1, wherein the reception information providing device communication unit receives the reception establishing information of each transmission device by carrying out communications different from communications according to the Bluetooth specification with each transmission device.

13. A method for providing a broadcast type service using communications according to a Bluetooth specification, the method comprising:
  (a) transmitting application data from each transmission device to at least one first reception device;
  (b) transmitting from each transmission device a reception establishing information of each transmission device which is necessary for a first reception device to receive the application data transmitted from each transmission device;
  (c) receiving the reception establishing information of each transmission device transmitted from each transmission device at a reception information providing device;
  (d) transmitting the reception establishing information of a specified transmission device from the reception information providing device to a prescribed second reception device;
  (e) receiving the reception establishing information of one transmission device transmitted from the reception information providing device at the second reception device; and
  (f) intercepting the application data, which is transmitted from said one transmission device according to the Bluetooth specification to the at least one first reception device at said second reception device according to the reception establishing information of said one transmission device without connecting said second reception device as a first reception device according to the Bluetooth specification with said one transmission device.

14. A reception information providing device in a broadcast type service system using communications according to a Bluetooth specification, the reception information providing device comprising:
  a communication unit configured to carry out communications with each transmission device and second reception devices; and
  a control unit configured to control the communication unit to receive a reception establishing information of each transmission device transmitted from each transmission device which is necessary for a first reception device to receive application data transmitted from each transmission device, and to transmit the reception establishing information of a specified transmission device to a prescribed second reception device, such that the prescribed second reception device can intercept application data, which is transmitted from the specified transmission device to at least one first reception device according to the Bluetooth specification, according to the reception establishing information of the specified transmission device received from the reception information providing device without connecting said prescribed second reception device as a first reception device according to the Bluetooth specification with said one transmission device.

* * * * *